(12) United States Patent
Palat et al.

(10) Patent No.: US 6,819,659 B1
(45) Date of Patent: Nov. 16, 2004

(54) RAU OPTIMIZATION IN STANDBY STATE

(75) Inventors: Sudeep Kumar Palat, Grange Park (GB); Hatef Yamini, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 891 days.

(21) Appl. No.: 09/642,303

(22) Filed: Aug. 21, 2000

(30) Foreign Application Priority Data

Aug. 23, 1999 (EP) .............................................. 99306659

(51) Int. Cl.[7] .............................. H04Q 7/22; H04Q 7/38
(52) U.S. Cl. ....................... 370/331; 370/338; 370/349; 455/432; 455/445
(58) Field of Search ................................ 370/328, 329, 370/338, 349, 351, 389, 401; 340/7.1, 7.2, 7.28, 7.29; 455/422, 426, 436, 440, 445, 446, 448, 456, 507, 515, 517

(56) References Cited

U.S. PATENT DOCUMENTS

| | | | | |
|---|---|---|---|---|
| 5,987,011 A | * | 11/1999 | Toh ............................. | 370/331 |
| 6,081,723 A | * | 6/2000 | Mademann .............. | 455/456.1 |
| 6,104,929 A | * | 8/2000 | Josse et al. ................. | 455/445 |
| 6,212,379 B1 | * | 4/2001 | Monrad et al. .......... | 455/435.1 |
| 6,292,667 B1 | * | 9/2001 | Wallentin et al. ........... | 455/458 |
| 6,347,091 B1 | * | 2/2002 | Wallentin et al. ........... | 370/437 |
| 6,505,047 B1 | * | 1/2003 | Palkisto .................... | 455/456.1 |
| 6,512,756 B1 | * | 1/2003 | Mustajarvi et al. ......... | 370/341 |
| 6,661,782 B1 | * | 12/2003 | Mustajarvi et al. ......... | 370/331 |
| 2002/0131396 A1 | * | 9/2002 | Knuutila et al. ............ | 370/349 |

FOREIGN PATENT DOCUMENTS

| | | | | |
|---|---|---|---|---|
| WO | WO 98/32299 | | 7/1998 | ............ H04Q/7/22 |
| WO | WO 98/32304 | | 7/1998 | ............ H04Q/7/38 |
| WO | WO 9941926 A2 | * | 8/1999 | ............ H04Q/7/38 |

OTHER PUBLICATIONS

European Search Report, dated Jan. 26, 2000.

* cited by examiner

*Primary Examiner*—Alpus H. Hsu

(57) ABSTRACT

An improved technique for reducing unnecessary routing area updates ensures that the location of a mobile terminal is known when the mobile terminal starts data communication after being in a standby state. If no packet transmission is taking place when a mobile terminal moves between the first and second wireless access systems in a common routing area of a packet radio access network, no routing area update takes place. If packet transmission is initiated, no routing area update may be required if the mobile is connected to the same wireless access system as in its previous packet transmission. If packet transmission is initiated, a routing area update may take place if the mobile is connected to a different wireless access system than in the previous packet transmission. If packet transmission is initiated by the mobile, the packet transmission initiation may include the routing area update.

5 Claims, 3 Drawing Sheets

RAU OPTIMIZATION IN STANDBY STATE

CROSS-REFERENCE TO RELATED APPLICATION

This application is related to commonly assigned and concurrently filed U.S. Patent Application entitled "Rau Optimisation For UMTS URA Connected State," Ser. No. 09/642559, filed Aug. 21, 2000, now U.S. Pat. No. 6,765,890, having as inventors Sudeep Kumar Palat, Michael Roberts and Hatef Yamini.

FIELD OF THE INVENTION

The present invention relates to routing area updates (RAUs) that take place as a mobile terminal moves from one radio access coverage area to another, and particularly to such movement when the mobile terminal is in a so-called standby mode in which no data is being transmitted or received.

BACKGROUND TO THE INVENTION

GSM (Global System for Mobile Communications) radio coverage, which may also be referred to as second generation (2G) radio coverage, is quite extensive today. During the introduction of UMTS (Universal System for Mobile Telecommunications), which may also be referred to as third generation (3G) radio coverage, UMTS radio coverage is expected to be limited to urban areas. Thus UMTS radio coverage will cover only parts of the more extensive GSM radio coverage areas. Even within UMTS coverage areas, the UMTS radio coverage cannot be expected to be contiguous. For example, given that the frequency used for UMTS is higher than that for GSM, the in-building penetration will not be as good as GSM. This will result in small pockets (such as inside buildings) without UMTS coverage within the overall UMTS coverage area. Thus, only GSM radio coverage will be available in these pockets.

A dual mode GSM and UMTS mobile terminal (a mobile terminal is referred to as user equipment (UE) in UMTS) can communicate using either one of the two radio access systems. If a dual mode mobile terminal communicating via the UMTS radio link goes out of UMTS coverage, to an area with only GSM coverage, it can expect to continue the communication via the GSM radio link, but with a consequential degradation of service. Similarly a dual mode mobile terminal in an area with only GSM radio coverage which moves into an area with UMTS coverage can expect to switch to the UMTS radio link to improve service.

Thus as a dual mode mobile terminal moves around within radio access areas, changes in the type of radio access can be expected as the available radio access systems change. As the mobile terminal moves between radio access areas, routing area updates occur to notify the necessary support network of the new position of the mobile in the routing area associated with the particular radio access type. Changing between two radio access systems involves additional signalling and can also lead to outages during the transition between the two systems. The impact of the additional signalling and outages depends on the network architecture and the protocols chosen.

Packet data communication can be bursty, and there can consequentially be long periods when a mobile terminal is not sending or receiving data. When a mobile terminal is in packet communication mode in the GSM network, it is communicating via the GPRS interface. A certain time-out period after sending the last packet, the mobile terminal will transfer to a standby state. In the UMTS network, after a certain time out period of no activity, the terminal will first transfer to a so-called 'UTRAN Registration Area (URA) connected' state. In the URA connected state, the connection between the mobile terminal and the UTRAN is maintained on the Iu link. After a longer period of time, the context in the UTRAN which identified the link to the mobile can be removed and the Iu connection torn down. While the state of the mobile terminal after the Iu connection has been torn down has not been given any specific name in the UMTS standards, it shall be referred to herein as a UMTS standby state.

In the proposed implementations of both the GSM and UMTS standby states, a mobile terminal always performs a routing area update as it moves between radio access system coverage areas at all times, even when it is in the standby state.

SUMMARY OF THE INVENTION

The present invention provides an improved technique for reducing unnecessary routing area updates, which still ensures the location of a mobile terminal is known when the mobile terminal starts data communication after being in a standby state.

According to the present invention there is provided a packet radio access network architecture having a common routing area supported by first and second wireless access systems, wherein a mobile terminal moves between the first and second wireless access systems in the common routing area whilst no packet transmission is taking place, then no routing area update takes place.

If packet transmission is initiated, no routing area update may be required if the mobile is connected to the same wireless access system as in its previous packet transmission.

If packet transmission is initiated, a routing area update may take place if the mobile is connected to a different wireless access system than in the previous packet transmission. If packet transmission is initiated by the mobile, the packet transmission initiation may include the routing area update.

If the packet transmission is initiated by one of the wireless access systems, the mobile may receive a paging request. Responsive to the paging request the mobile may initiate a routing area update. The first and second wireless access systems may be GSM and UMTS access systems.

According to the present invention there is provided a method of controlling routing area updates within a common routing area supported by first and second wireless access systems, wherein if a mobile terminal moves between first and second wireless systems in the common routing area whilst no packet transmission is taking place, then no routing area update takes place.

If packet transmission is initiated, no routing area update may take place if the mobile is connected to the same wireless access system as in its previous packet transmission.

If packet transmission is initiated, a routing area update may take place if the mobile is connected to a different wireless access system than in the previous packet transmission.

If packet transmission is initiated by the mobile, the packet transmission initiation may include the routing area update.

If the packet transmission is initiated by one of the wireless access systems, the mobile may receive a paging request. Responsive to the paging request the mobile may initiate a routing area update.

The first and second wireless access systems may be GSM and UMTS access systems.

Thus a mobile terminal (or user equipment) moving back and forth between a 2G environment and a 3G environment without sending any data will not generate any signalling. This frequent switching between 2G and 3G environments is likely to happen at the edges of the patchy 3G coverage areas.

This allows almost all of the 2G and 3G implementation of the serving GPRS support nodes (SGSNs) to be kept separate. The routing area update (RAU) performed before sending any data from the new access network will result in the context transfer from the 2G to the 3G and also the set up of the proper state machines and protocol stack.

DESCRIPTION OF PREFERRED EMBODIMENT

Figure 1:
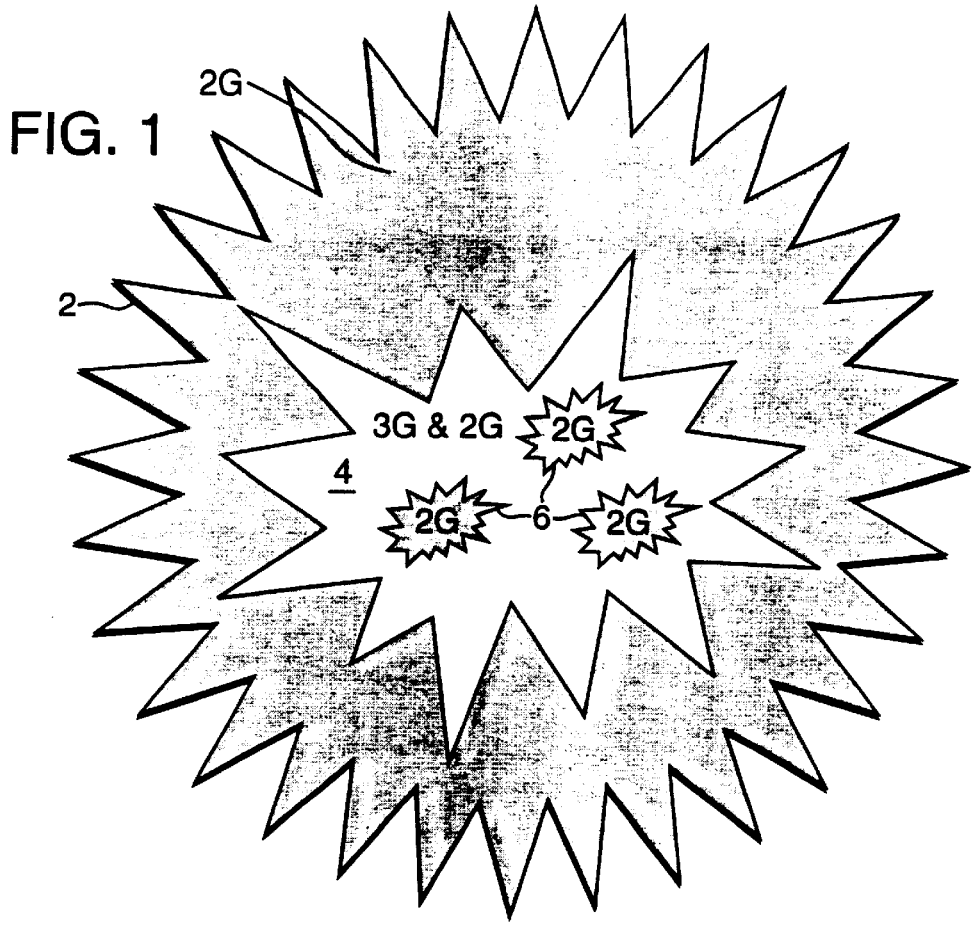
FIG. 1 illustrates the patchy nature of UMTS radio coverage in a GSM coverage area.

FIG. 1 illustrates the coverage expected to be provided by UMTS in a GSM area. The shaded areas represent areas with only GSM (2G) coverage. The non-shaded areas represent areas with both GSM (2G) and UMTS (3G) coverage. Thus the whole of the area 2 is provided with GSM coverage. The smaller area 4 within the area 2 is intended to be provided with UMTS coverage in addition to GSM coverage. However pockets, designated by reference numeral 6, exist within the UMTS coverage area 4, such that only GSM coverage is provided in the pockets 6.

Figure 2:
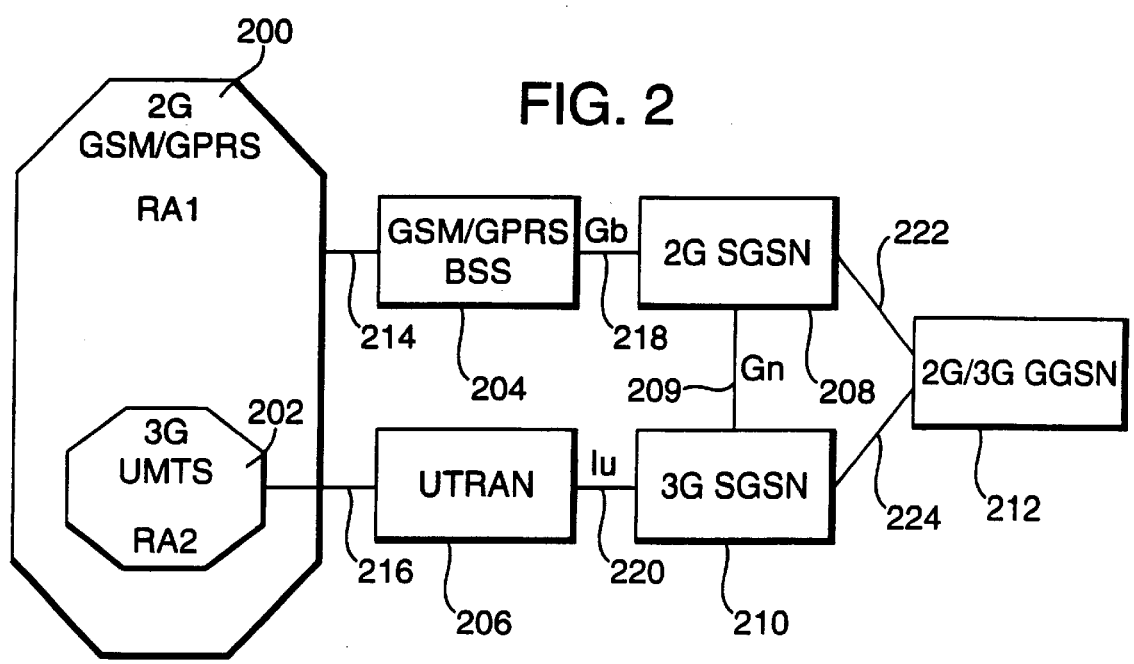
FIG. 2 illustrates the conventional network architecture of UMTS and GSM having distinct routing areas, with respective distinct serving GPRS support nodes.

The general current conventional network architecture for supporting the radio coverage as illustrated in FIG. 1 is as shown in FIG. 2. The GSM radio access area and the UMTS radio access area are considered as independent systems having distinct routing areas, each served by a different serving GPRS support node (SGSN). Each SGSN is thus associated with distinct routing areas. The SGSNs provide the support node for the respective radio systems to support packet switched communications.

Referring to FIG. 2, the GSM radio access area supports a first routing area 200 designated RA1, and the UMTS radio access area supports a second routing area 202 designated RA2. It can be seen that the second routing area RA2 is overplayed on the first routing area RA1.

The first routing area RA1 is associated with a GSM/GPRS BSS 204 and a SGSN 208, which may be labelled as a 2G SGSN since it is provided to support the 2G GSM/GPRS network. The second routing area RA2 is associated with a UMTS terrestrial radio access network (UTRAN) 206 and a SGSN 210, which may be labelled as a 3G SGSN since it is provided to support the 3G UMTS network. A common 2G/3G gateway GPRS support node (GGSN) 212 is provided to support both the 2G GSM/GPRS network and the 3G UMTS network.

A connection 214 connects the GSM/GPRS BSS 204 to the base stations supporting the GSM/GPRS cells in the routing area RA1. The GSM/GPRS BSS 204 is connected to the 2G SGSN 208 via a Gb interface connection 218, and the 2G SGSN 208 is connected via a connection 222 to the 2G/3G GGSN 212. The UTRAN 206 is connected to the UMTS core network via a connection 216. The connection 216 connects the UTRAN 206 to the base stations supporting the UMTS cells in the routing area RA2. The UTRAN 206 is connected to the 3G SGSN 210 via an Iu interface connection 220, and the 3G SGSN 210 is connected to the 2G/3G GGSN 212 via a connection 224. The 2G SGSN 208 and the 3G SGSN 210 are interconnected via a Gn interface connection 209.

If a mobile terminal is compatible with both GSM/GPRS and UMTS, then when it is in a radio access area covered by both systems it may connect to either network. For packet transmissions, where GSM/GPRS and UMTS are supported, a mobile terminal will preferably operate in UMTS mode to take advantage of the better transmission supported thereby.

In the conventional network architecture of FIG. 2, every time a mobile moves between 2G and 3G coverage, a routing area update (RAU) is required irrespective of the state of the mobile terminal, i.e. whether it is in standby mode or otherwise. These RAUs inform the respective SGSN of the location of the mobile terminal (i.e. whether in routing area RA1 or RA2) and also set up the part of the protocol stack at the SGSN required for the data transmission.

The RAUs performed when the mobile terminal moves between 2G and 3G are inter-SGSN RAUs and hence the home location register (HLR) also needs to be updated, since the HLR stores the correct SGSN number of a particular mobile terminal. Thus the HLR needs to be updated every time a mobile terminal 'moves' from one SGSN to another. The interconnection of the HLR in the network architecture of FIG. 2 is not shown for reasons of clarity and will be understood by one skilled in the art.

A PDP context is a context initiated by a mobile terminal for communication. If the user has a PDP context active, the GGSN and GPRS tunnelling protocol (GTP) links must be set up. The GTP between the GGSN and the SGSN needs to be updated when a mobile terminal moves from one SGSN to another with a PDP context active. Both of these involve considerable signalling overheads.

It is therefore apparent that these routing area updates which take place as a mobile terminal moves between routing areas whilst in a standby mode waste valuable resources. Avoidance of the RAU update will not only reduce signalling traffic but also improve Quality of Service (QoS).

Figure 3:
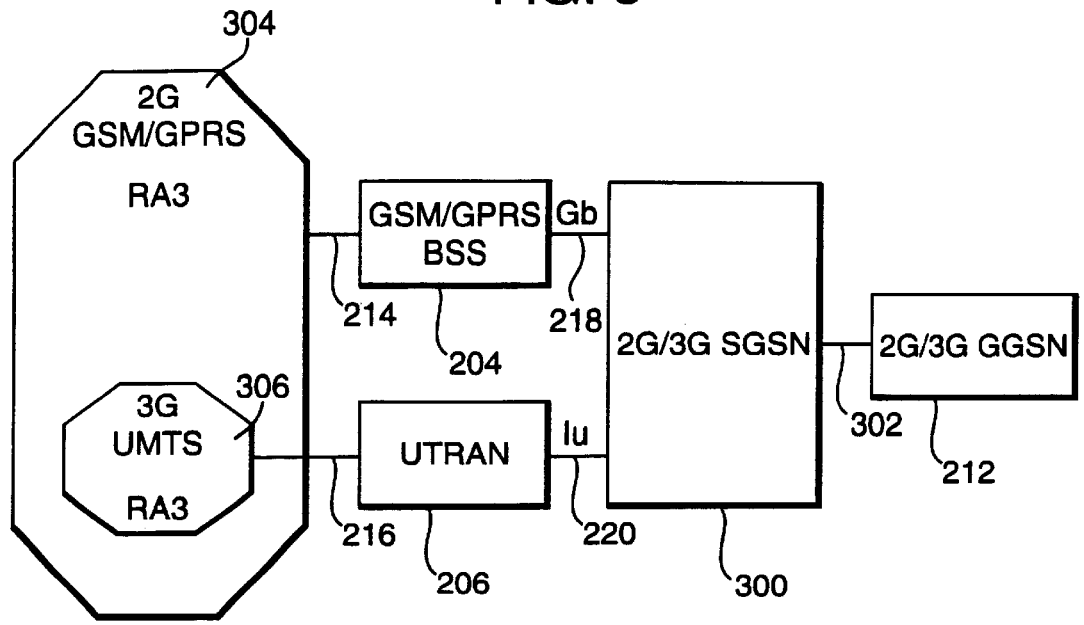
FIG. 3 illustrates a network architecture in which the UMTS and GSM routing areas are common, with a shared GPRS support node.

A network architecture for avoiding the RAU whenever a mobile terminal in standby state moves between 2G and 3G is shown in FIG. 3. Like reference numerals are used in FIG. 3 to identify elements corresponding to elements shown in FIG. 2. The network architecture of FIG. 3 differs from that of FIG. 2 in that the 2G SGSN 208 and the 3G SGSN 210 have been replaced by a single 2G/3G SGSN 300 which connects to the GSM/GPRS BSS 204 via the Gb interface connection 218 and connects to the UTRAN 218 via the Iu interface connection 220. The 2G/3G SGSN 300 connects to the 2G/3G GGSN 212 via connection 302.

As a result of the shared 2G/3G SGSN 300, the routing areas RA1 and RA2 of FIG. 2 become a shared routing area, designated as RA3 in FIG. 3. Thus the GSM/GPRS BSS 204 supports a radio access area designated by reference numeral 304 corresponding to routing area RA3. Similarly, the UTRAN 218 supports a radio access area 306 corresponding to the same routing area RA3.

In the network architecture of FIG. 3, the 2G and 3G radio access systems are served by the same SGSN, and consequently are associated with the same routing area. This avoids the requirement to perform a routing area update when crossing between 2G and 3G coverage areas. However, with such an architecture, the SGSN becomes quite complex. This is because a mobile terminal in the standby state moving between 2G and 3G will not generate a radio access update. In other words, the SGSN cannot be aware of the position of the mobile terminal, and the mobile terminal can be located either in the 2G or in the 3G part of the routing area. Thus when a packet from the network arrives at the SGSN for transmission to a mobile terminal, the SGSN must page the mobile in both the 2G and 3G radio access systems to determine the location of the mobile terminal.

In paging a mobile, the SGSN broadcasts a paging signal, which identifies the mobile, in the routing area. The paging signal indicates to the mobile identified therein that the core network has a packet for transmission to the mobile. When a mobile receives a paging signal which identifies that mobile, if the mobile is ready to receive the packet by sending a paging response to the network.

The protocol stack and the mobility management state machine for the 2G and 3G networks at the SGSN are different. Depending on where the mobile terminal's paging response came from, either the 2G or 3G area, the mobility management state machine must adapt to the appropriate behaviour. The appropriate protocol stacks must be set up before the data is sent to the terminal. All this must be done autonomously within the SGSN based on the paging response. This complicates the state machines for mobility management.

If the mobile terminal has data to send, the situation is even more complex. The SGSN must be prepared to accept data from either 2G or 3G at any time in the standby state. This is complex because the appropriate protocol stacks are not set up prior to the mobile terminal sending the data and there are no signalling messages exchanged at all before the data packet is sent.

Figure 4:
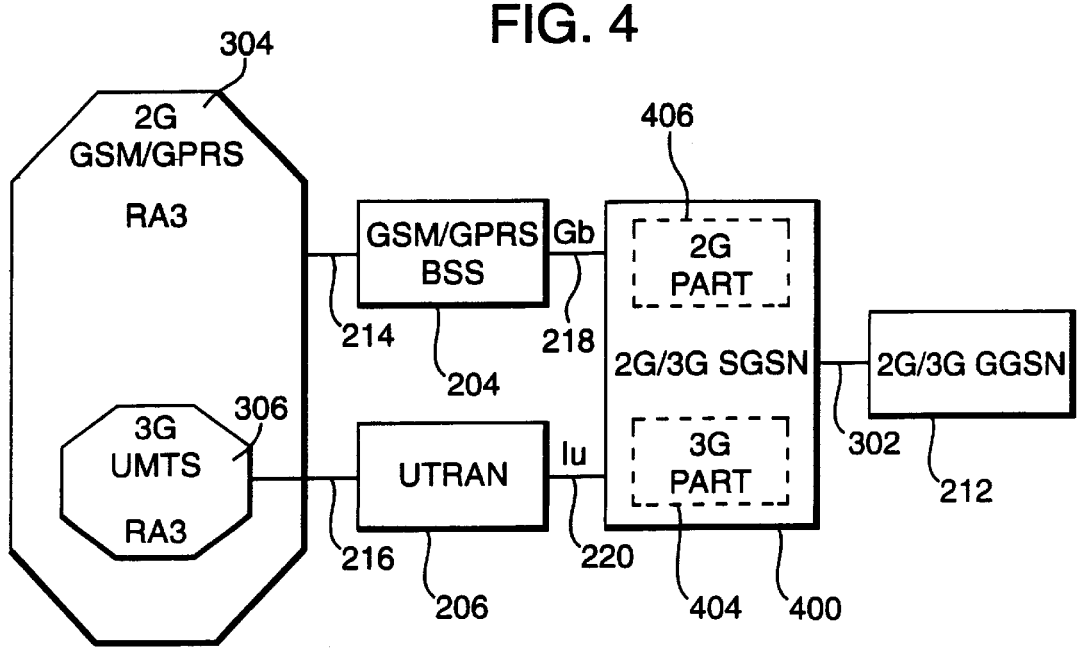
FIG. 4 illustrates a network architecture in which UMTS and GSM routing areas are common, with a partially shared GPRS support node.

A further modification to the network architecture of FIG. 3 in accordance with the present invention is shown in FIG. 4. Again like reference numerals are used to designate elements in FIG. 4 corresponding to elements shown in FIGS. 2 or 3.

The network architecture of FIG. 4 is similar to that shown in FIG. 3, except that the 2G/3G SGSN 300 has been replaced by a partially split 2G/3G SGSN 400. The split 2G/3G SGSN 400 allows larger separation of the implementation of 2G and 3G elements than in the combined 2G/3G SGSN 300 of FIG. 3. This allows the 2G and 3G parts of the SGSN to be largely separate thereby simplifying the SGSN development. As shown in FIG. 4, the 2G/3G SGSN comprises a 2G functional part 406 and a 3G functional part 404.

The routing area is still a common routing area RA3 which spans both the 2G radio access area and the 3G radio access area. A mobile terminal in a standby mode of operation moving between 2G and 3G radio access areas within the same routing area does not perform a routing area update. Thus, referring to FIG. 1, a mobile terminal in standby mode which moves from one of the pockets 6, into the 3G coverage area 4 and then into the 2G coverage area 2 does not perform any routing area updates.

When the mobile terminal in the standby state wants to send data, then one of two operations occur. If the mobile terminal is in the same radio access network as it was when it last sent any data, the procedure to be followed for sending the new data is exactly as defined in that radio access network by 2G or 3G. If the mobile terminal is in the other access network than the one from which it sent data last, a routing area update must be performed before sending the data. For example, a terminal in standby state in 2G will not perform a routing area update when it crosses into 3G, but will do so if it still remains in the 3G radio access area when it has any data to transmit.

While the mobile terminal is in the standby state in 2G or 3G, if the SGSN receives data which is to be sent to the mobile, it must page the entire routing area, which includes both 2G and 3G coverage. If the mobile terminal is in the same radio access network as it was when it last sent any data, the procedures to be followed is exactly as defined in 2G or 3G, and a normal paging response is generated. If the terminal has changed between 2G and 3G between the time it last sent or received any data and the paging message, it performs a routing area update instead of a paging response. The network then accepts this routing area update as a paging response.

Thus, a mobile terminal in the standby state moving back and forth between 2G and 3G environments without sending any data will not generate any signalling. This frequent switching between 2G and 3G environments is likely to happen at the edges of the patchy 3G coverage.

Thus, a routing area update is performed only if it is necessary at the time that the data used to be transmitted or received.

This allows almost all of the 2G and 3G implementation of the SGSN to be kept separate. The RAU performed before sending any data from the other access network will result in the context transfer for the mobile terminal from the 2G to the 3G functional part 404, and also the set up of the proper state machines and protocol stack.

The paging message will still have to be sent via both access networks, but the other SGSN only needs to pass the paging message transparently without processing it or maintaining any state machine.

It should be possible for the SGSN to identity from the RAI and P-TMSI, whether the user was last registered in the 2G or 3G network. Normally, the RAI provides this distinction. If, as in this case, the same RAI is used for both 3G and 2G, then the P-TMSI address space for 2G and 3G should be disjoint. This is an operator configuration issue.

If the mobile terminal happens to be in "other" coverage area while the Periodic Routing Area update timer ran out, if should perform a regular periodic routing area update and will then be considered as registered in that access network.

In the above, a technique has been discussed for improving efficiency when the mobile terminal is in the standby state. As indicated above, for a mobile terminal in the GSM/GPRS mode of operation, the mobile terminal is either in an active communication state or in the standby state. For a mobile terminal in a UMTS mode of operation, the mobile terminal additionally has a 'pre-standby' mode of operation called the URA connected state.

During this URA connected state, although no packet transmission takes place UTRAN registration area updates still take place as the mobile terminal moves around in the URA. It would therefore also be advantageous to apply the principles discussed hereinabove in the URA connected state, such that routing are updates are not carried out if there is no data being transmitted. Although the technique described hereinabove partially works in URA connected state, there is a drawback which prevents its general application, as discussed hereinbelow.

In the URA connected state a radio network controller (RNC) in the UTRAN maintains the link with the mobile terminal in the routing area, and the 3G SGSN maintains a link with the UTRAN 206 via the Iu interface connection 220. If the principles are applied as described above, then as the mobile terminal moves between different radio access areas it performs no routing area updates if it is in the URA connected state. When the mobile terminal has data to transmit it performs a routing area update if it is now connected in a different radio access network. Thus, when the mobile terminal transmits data, the principle of the above-described technique for the standby mode of operation works additionally in the URA connected state.

If the principle of the standby mode are applied and the mobile terminal performs no routing area updates in the URA connected state, and the network initiates a data transmission, then a problem may arise. In the URA connected state, as discussed hereinabove, the network still assumes the mobile to be attached to the UMTS radio access system owing to the link maintained between the UTRAN and the routing area. Thus when the network wishes to transmit data the network pages the URA only from the UTRAN. If the mobile has not moved from the 3G routing area since its last packet-transmission, then operation continues as normal. If the mobile has moved, however, then the paging by the UTRAN will be unsuccessful, as no paging is carried out by the GSM/GPRS radio access system. Thus the above-described technique for reducing routing area updates in the standby state cannot be safely implemented in the URA connected mode of operations.

Therefore in the following there is presented a modified technique for a more efficient implementation of routing area updates for when a mobile terminal supporting UMTS operation is in the URA connected state. This technique is not limited to the network architecture of FIG. 3 or 4. Although it may be applied in such architectures, it is equally effective in an architecture such as that of FIG. 2 where the SGSNs for the respective radio access systems are entirely distinct.

Figure 5:
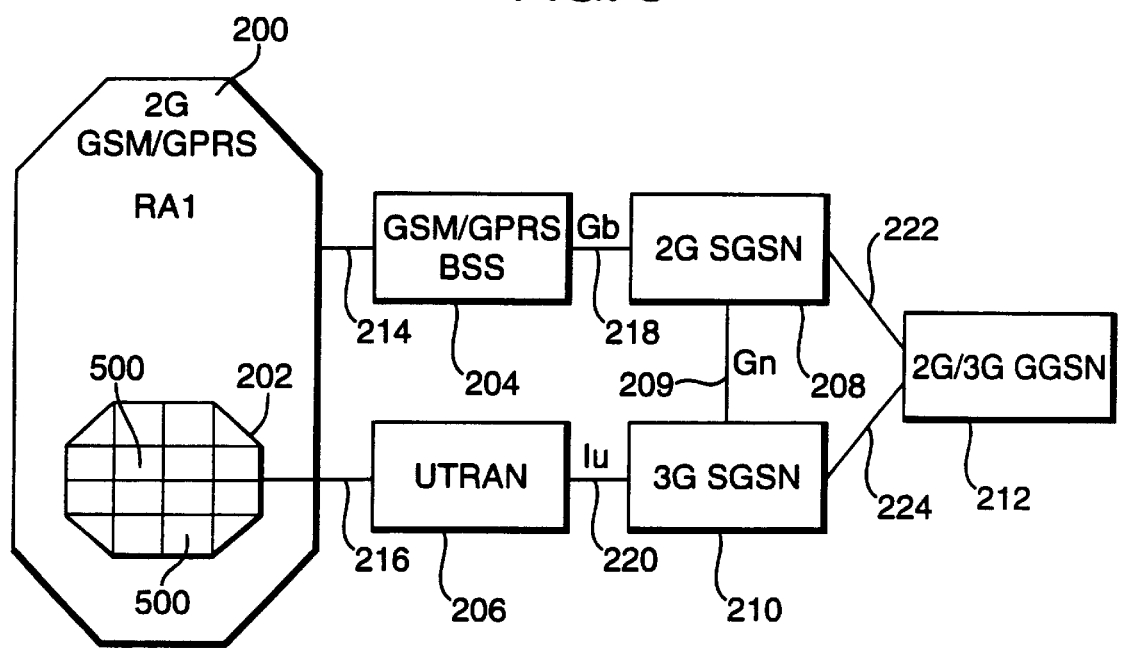
FIG. 5 illustrates a further adaptation of the network architecture of FIG. 2 in an improvement to the routing area update technique in the particular example of a 'URA connected' state in a UMTS mobile terminal.

Referring to FIG. 5, there is shown a network architecture corresponding to that of FIG. 2 for the purpose of illustrating the technique for use in the URA connected mode of operation. Like reference numerals are used to denote like elements.

Referring to FIG. 5, the routing area RA2 is conventionally sectioned into a plurality of UTRAN registration areas 500. In the URA connected state the UTRAN maintains a context for the mobile terminal which holds, specifically the UTRAN registration areas in which the mobile terminal was last in when it last made a packet transmission. The UTRAN is connected via the Iu interface to the 3G SGSN 210.

In a conventional system, in the URA connected state when the network wishes to send data to the mobile terminal, the radio network controller (RNC) in the UTRAN pages the whole of the routing area RA2 because of the connection maintained from the 3G SGSN to the UTRAN. The routing area RA1 is not paged. If the mobile terminal moves into the routing area RA1 in the URA connected state, then a routing are update takes place.

In accordance with the new technique, when the mobile terminal is in the URA connected state, no routing area updates take place as the mobile terminal moves around between radio access.

If the mobile terminal wishes to send data, then as in the operation described hereinabove for the standby state the mobile performs a routing area update if the mobile terminal has moved to a new radio access area since its last communication.

If the network wishes to send data to the mobile terminal, then as conventionally an indication of such is provided to the UTRAN which still has an association for the mobile terminal (referred to as a UE in UMTS) via the Iu interface to the SGSN. Responsive thereto, the UTRAN issues two paging signals, as discussed hereinafter The first paging signal is the conventional radio network temporary identifier (RNTI) paging signal issued to the URA routing area RA2 supported by the UMTS radio access network. The second paging signal is a paging signal to initiate a paging of the routing area RA1. The second paging signal may take several forms. The second paging signal requires a new 'paging request' message across the Iu interface to the 3G SGSN.

In a first embodiment, the routing area is paged using the standard packet temporary mobile subscriber identifier (P-TMSI) paging signal. This does not require any new messages to be defined over the Gb interface or the air interface. The UTRAN generates the second paging signal by sending a paging request over the associated Iu connection on line 220 to the 3G SGSN 210. The 3G SGSN 210 creates a paging message with P-TMSI identifier responsive to the paging request on interface 220, and sends it on the Gn interface on line 209 to the 2G SGSN 208. Alternatively for a combined 2G/3G SGSN the P-TMSI identifier is transferred internally.

Responsive to the P-TMSI paging signal, the 2G SGSN 208 communicates with the GSM/GPRS BSS 204, which sends the P-TMSI paging signal to the routing area RA1.

In a second embodiment, the 2G routing area and the 3G routing area are paged using an RNTI identifier. This requires a new message to be defined over the Gb interface and the air interface between the GSM/GPRS BSS and the 2G network. The UTRAN generates a new type of paging message, which is sent via the 3G SGSN and 2G SGSN to the GSM/GPRS BSS. The GSM/GPRS BSS then broadcasts the new paging message to the routing area RA1.

As described earlier, a routing area update by the mobile terminal is accepted as a paging response by the network.

Although the invention has been described with particular reference to an environment in which the radio access areas are GSM/GPRS and UMTS, it will be appreciated that the invention is more broadly applicable to environments in which at least two radio access areas overlap.

What is claimed is:

1. A method of controlling routing area updates within a common routing area supported by a first and second wireless access system, comprising the step of:

maintaining current routing area information if a mobile terminal moves between the first and second wireless access system in the common routing area and whilst no packet transmission is taking place, both not making a routing area update and maintaining routing area information of a last routing area update.

2. The method of claim 1, comprising the step of maintaining current routing area information if packet transmission is initiated and if the mobile terminal is connected to the same wireless access system as in its previous packet transmission, both not making a routing area update and maintaining routing area information of the last routing area update.

3. The method of claim 1, further comprising the step of performing a routing area update if packet transmission is initiated and if the mobile is connected to a different wireless access system than in the previous packet transmission.

4. The method of claim 3, further comprising the step of receiving routing area update information as part of packet transmission initiation.

5. The method of claim 3, further comprising the steps of:
sending the mobile a paging request if the packet transmission is initiated by one of the wireless access systems; and
receiving routing area update information after sending the paging request.

* * * * *